(12) United States Patent
Gupta et al.

(10) Patent No.: US 10,613,883 B2
(45) Date of Patent: *Apr. 7, 2020

(54) MANAGING VIRTUAL MACHINE MIGRATION

(71) Applicant: Amazon Technologies, Inc., Seattle, WA (US)

(72) Inventors: Diwakar Gupta, Seattle, WA (US); Thomas Friebel, Dresden (DE); Sebastian Martin Biemueller, Dresden (DE); Bret David Kiraly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/612,974

(22) Filed: Jun. 2, 2017

(65) Prior Publication Data

US 2017/0269951 A1    Sep. 21, 2017

Related U.S. Application Data

(63) Continuation of application No. 14/562,423, filed on Dec. 5, 2014, now Pat. No. 9,672,054.

(51) Int. Cl.
*G06F 9/455* (2018.01)
*G06F 9/50* (2006.01)
*G06F 3/06* (2006.01)

(52) U.S. Cl.
CPC ...... *G06F 9/45533* (2013.01); *G06F 9/45558* (2013.01); *G06F 9/5083* (2013.01); *G06F 2003/0697* (2013.01); *G06F 2009/4557* (2013.01)

(58) Field of Classification Search
CPC ........ G06F 9/45533; G06F 2003/0697; G06F 2009/4557; G06F 3/0601; G06F 9/45558; G06F 9/5083
See application file for complete search history.

(56) References Cited

U.S. PATENT DOCUMENTS

| | | |
|---|---|---|
| 9,058,199 B2 * | 6/2015 | Tsirkin ............... G06F 9/45558 |
| 2008/0222375 A1 | 9/2008 | Kotsovinos |
| 2011/0138384 A1 | 6/2011 | Bozek |
| 2014/0215459 A1 | 7/2014 | Tsirkin |
| 2015/0106420 A1 | 4/2015 | Warfield |

OTHER PUBLICATIONS

Liu, et al., Live Virtual Machine Migration via Asynchronous Replication and State Synchronization, [online] IEEE (2011), pp. 1-15.

* cited by examiner

*Primary Examiner* — Emerson C Puente
*Assistant Examiner* — Jonathan R Labud
(74) *Attorney, Agent, or Firm* — Knobbe Martens Olson & Bear LLP

(57) ABSTRACT

Systems and methods for the management of migrations of virtual machine instances are provided. In response to a request to migrate a virtual machine instance, a migration manager may provide estimates regarding the requested migration before initiating the migration. During the migration process, the migration manager may report status or request instructions regarding the migration based on various determined migration events, thereby facilitating external control of the migration process.

20 Claims, 6 Drawing Sheets

MANAGING VIRTUAL MACHINE MIGRATION

This application is a continuation of U.S. patent application Ser. No. 14/562,423, entitled MANAGING VIRTUAL MACHINE MIGRATION, and filed Dec. 5, 2014, now U.S. Pat. No. 9,672,054, the entirety of which is incorporated by reference herein.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources within the data centers, virtualization technologies may allow a single physical computing device to host one or more instances of virtual machines that appear and operate as independent computing devices to users of a data center. With virtualization, software applications running on the physical computing device can create, maintain, delete, or otherwise manage virtual machine instances in a dynamic manner. In some instances, migration of a virtual machine instances may be desirable, such that the information maintained or used by an instantiated virtual machine instance is transmitted from a first physical computing device to a virtual machine instance instantiated on a second computing device. Often times, the migration of a virtual machine includes copying memory data associated the virtual machine from the first physical computing device to the second computing device and configuring applicable computing resources to be associated a corresponding virtual machine hosted on the second computing device.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
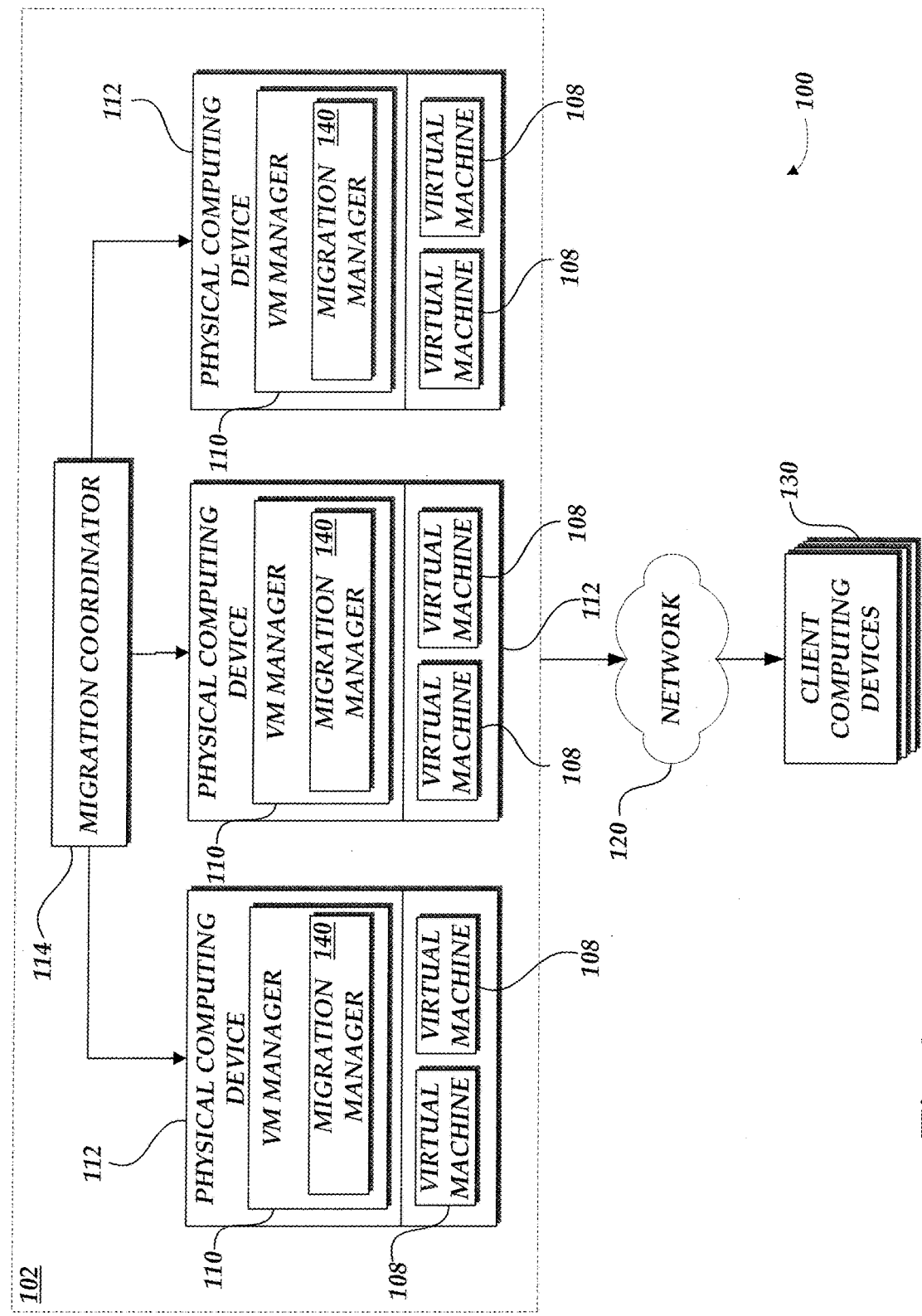
FIG. 1 is a block diagram illustrating an embodiment of a networked environment having physical computing devices hosting virtual machine instances associated with a migration manager.

Generally described, aspects of the present disclosure relate to the management of virtual machine instances. Specifically, systems and methods are disclosed which facilitate migrations of virtual machine instances between physical host computing devices. In one embodiment, a migration manager, such as a component of a hypervisor that manages virtual machine instances hosted on a source computing device, receives a request to migrate a virtual machine instance to a target computing device. In response to the request, the migration manager begins the migration by entering into a "memory-copy" phase. In this phase of the migration, the virtual machine continues to run and the migration manager copies the memory and any additional information from the source to the target. As the migration manager copies memory, it marks each copied memory page in a data structure as having been copied. If the running virtual machine writes to a previously copied memory page, the migration manager can mark it as dirty and that one needs to be copied again. Over time, the migration manager will converge on a set of memory pages that are being updated by the operating system faster than the migration manager can copy them over to the target, these pages are called "active" memory pages in that the guest operating system is actively working on them. In an embodiment, at this point the migration manager can send a message to a migration coordinator indicating that it is ready to enter into the "stop-and-copy" phase of the migration (e.g., a phase where the virtual machine is stopped; and the active memory pages are copied to the target along with state such as CPU and virtual device state), but is delaying entering the phase until it receives authorization from the migration coordinator. As such, the migration manager will continue to stay in the memory-copy phase, and continue to copy dirty pages to the target. The migration coordinator can determine whether to initiate the stop-and-copy phase and send a request to the migration manager. The migration manager can receive the request and transition to the stop-and-copy phase. The virtual machine can then begin running on the target.

In an embodiment, the migration coordinator can be configured to use information about the service provider environment in which the source and target operate as well as information about the migration when determining whether to transition between phases of a migration. For example, services that provide information or manage resources used by the virtual machine can populate a data store with information about the status of the network, the migration, or the resources attached to or used by the virtual machine.

In some example embodiments, the migration coordinator can send a request to the source computing device to obtain relevant information for determining estimates regarding the migration. In an example embodiment, the migration manager may provide the determined estimates to the migration coordinator prior to transmission of data corresponding to the virtual machine instance (e.g., memory pages accessed by the virtual machine instance) for the migration. For example, the migration manager may monitor or otherwise obtain the virtual machine instance usage information corresponding a computing resource, such as the size of random access memory (RAM) allocated for use by the virtual machine instance. The migration manager may obtain information regarding data communications, such as a bandwidth of a local area network (LAN) connection, between the source and target computing devices. Based on the obtained information, the migration manager may determine an estimated time for completing the migration and provide the estimate to a migration coordinator that requested the migration.

In an example embodiment, the migration coordinator analyzes the migration estimate and decides whether to proceed with the migration. If the migration coordinator decides to proceed with the migration, the migration coordinator transmits a migration initiation command to the migration manager associated with the source computing device. In one embodiment, the initiation command could be as simple as a "start migration" command. In another embodiment, the initiation command could be more complex, and include various criteria related to management of the migration process or set of processes. For example, the initiation command may specify conditions for the migration manager to determine events associated with the migration and report the event to the migration coordinator. The migration events may be related to completion of a phase of the migration, such as the convergence on a set of active memory pages. The migration events may be related to an exception associated with the migration, such as an anomaly occurred with the network connection between the source and the target. The migration events may be time-based, such as detection of a passage of specified period of time since the beginning of memory copy, etc.

In other embodiments, the initiation command may also specify actions that the migration manager should take upon detecting a migration event, such as to send status report of the migration to the migration coordinator, to suspend or delay the migration, to report the migration event and request a further command from the migration coordinator regarding the migration, or to cancel or terminate the migration. The migration manager then processes the migration initiation command and initiates data transmission (e.g., copying memory data) for the migration from the source computing device to the target computing device.

The migration manager monitors or otherwise obtains information regarding the data transmission, one or more virtual machine instances being migrated, and relevant usage of computing resources. If the obtained information meets a criterion specified in the migration initiation command to constitute a migration event (or likelihood of a migration event), the migration manager performs corresponding actions such as reporting migration status, pausing the migration, requesting a further command, etc. In some embodiments, the migration manager itself may maintain default criteria related to migration of virtual machine instances, which may supplement or be overridden by criteria, if any, specified in the migration initiation command. For example, a default criterion may require the migration manager to report the status of migration to the migration coordinator periodically in accordance with a predefined time interval.

If the migration manager determines the occurrence of a type of migration event (e.g., memory pages that are not frequently accessed by the virtual machine have all been copied to the target computing device and the virtual machine needs to be stopped or shut down at the source device before the frequently accessed memory pages can be copied) where the migration manager needs to request a further command from the migration coordinator, the migration manager may report the migration event to the migration coordinator. For example, the migration manager may transmit a message or notification to the migration coordinator that the memory-copy phase of the migration has been completed. The migration manager may also provide an updated estimate of the migration that indicates an amount of time the migration manager estimates that it will take to copy the remaining memory and any additional state or data based on available bandwidth.

The migration coordinator processes the reported migration event. In one embodiment, the migration coordinator can decide whether to proceed further with the migration. In another embodiment, the migration coordinator can determine how to proceed further with the migration, including determining whether to make modifications to aspects of the migration process. For example, the migration coordinator may adjust computing resources related to the migration, such as limiting usage of the network connection between the source and target computing devices by other virtual machines or applications. As another example, the migration coordinator may decide to include additional or revised criteria for determining migration events in a follow-up command to the migration manager. As a further example, the migration coordinator may delay entrance into a next phase of the migration until certain resources (e.g., security settings, network interfaces, storage volumes, etc.) are ready to be associated with a corresponding virtual machine instance at the target computing device. As still another example, the migration coordinator may delay entrance into a next phase of migration until the condition of a network connecting source, target or other computing devices are ideal for the next phase, such as to minimize the downtime between stopping execution of the virtual machine instance at the source and starting a corresponding virtual machine instance at the target. One skilled in the relevant art will appreciate that additional or alternative conditions may also be applied in the determination of whether to proceed with a virtual machine migration.

If the migration coordinator determines that one or more migration processes are to continue, the migration coordinator transmits a migration continuation command in response to the reported migration event, to the migration manager. The migration continuation command may instruct the migration manger to complete the migration. The migration manager, in turn, may process the migration continuation command, cause the execution of the virtual machine instance to be stopped at the source computing device, and copy the remaining memory pages associated with the virtual machine to the target device. Once all the related computing resources are ready to be associated with a corresponding virtual machine instance at the target computing device, the migration coordinator may cause the corresponding virtual machine to be activated on the target computing device, for example, by sending a command to a hypervisor executing on the target computing device to instantiate the corresponding virtual machine with all the associated computing resources.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of host computing devices, one or more aspects of the present disclosure can be applied with regard to different types or configurations of physical computing devices or combinations thereof.

FIG. 1 is a block diagram illustrating an embodiment of a networked environment 100 having physical computing devices 112 hosting virtual machine instances 108 associated with a migration manager 140. The illustrated example includes a service provider network 102. The service provider network 102 includes multiple physical computing devices 112, each physical computing device 112 hosting multiple virtual machine instances 108 via a virtual machine manager 110, which includes a migration manager 140. The physical computing devices 112 can correspond to a wide variety of devices, such as servers, that include a wide variety of software and hardware components and configurations. The physical computing device 112 can include a local data store (not shown), or be configured to communicate with a data store over a network (not shown). Each physical computing device 112 is capable of hosting multiple virtual machine instances 108. At least some of the virtual machine instances 108 may be provisioned to provide a variety of different desired functionalities depending on the needs of the service provider network 102 or the users of the virtual machines (e.g., customers of the service provider). Examples of the types of desired functionality, include but are not limited to: database management, serving or distributing data or content (e.g., Web servers), managing load balancing or network resources, managing network connectivity or security, providing network addressing information, managing client or server redirection, or any other functionality. One skilled in the relevant art will appreciate that the service provider network 102 is logical in nature and can encompass physical computing devices 112 from various geographic regions. Additionally, the service provider network 102 can include one or more physical computing devices that do not host virtual machine instances 108.

Each physical computing device 112 can execute a virtual machine manager 110 to manage multiple aspects of virtual machine instances. Such a virtual machine manager 110 may often be referred to as a "hypervisor." The virtual machine manager 110 can be executed directly on the physical computing hardware of the device 112 and can operate within a management domain. The virtual machine manager 110 can function like a host operating system for the physical computing device 112. The virtual machine manager 110 can control the hardware of the physical computing device 112 and manage and configure virtual machine instances 108 running on the physical computing device 112.

The virtual machine manager 110 may include a migration manager 140, which monitors the virtual machine instances 108 hosted by the respective physical machine 112 in which the migration manager 140 resides. Alternatively, the migration manager 140 may be a software module independent of the virtual machine manager 110, executing on the physical computing device 112 or one or more associated computing devices. Illustratively, the migration managers 140 are capable of monitoring or otherwise obtaining information regarding the resource usage of each virtual machine instance 108. As described above, this resource usage may correspond to a virtual machine instance 108's use of RAM or access requests to RAM. In some embodiments, the resource use may correspond to a virtual machine instance 108's use of other resources, such as hard disk drive (HDD) usage, central processing unit (CPU) usage, graphics processing unit (GPU) usage, or network resources. Additionally, various metrics of resource use may be applied to monitored resources. Examples of such metrics include, but are not limited to, the amount of resources used, the change velocity of resource use, and the latency associated with a resource use. Though these resources are described for illustrative purposes, one of ordinary skill in the art will appreciate that the migration manager 140 may monitor or otherwise obtain information regarding any resources available to the virtual machine instances 108.

The migration manager 140 may also monitor or otherwise obtain information, such as bandwidth, throughput, jitter, bit error rate, latency, or other network performance information, regarding communications or interactions between the physical computing device with which the migration manager 140 is associated and other physical computing devices, other systems or data services. One of ordinary skill in the art will appreciate that the migration manager 140 may monitor or otherwise obtain information regarding any resources available to the physical computing device 112 for communications or interactions with another entity.

The migration managers 140 may receive requests to migrate a virtual machine instance 108, and respond to the request in accordance with the processes and functionalities described herein. Though the migration managers 140 are shown to be in communication with a migration coordinator 114 (which will be described in more detail below), a migration manager 140 may operate independently of a migration coordinator 114.

In communication with the physical computing devices is a migration coordinator 114. In some embodiments, the migration coordinator 114 is a component of a service provider network system manager (not shown) that manages the service provider network 102, for example, by configuring, coordinating or monitoring data exchange or resource allocation among various physical or virtual components associated with the service provider network 102. In other embodiments, the migration coordinator 114 may be a standalone software module implemented independently on computing hardware of one or more computing devices. In other embodiments, the migration coordinator 114 may be a web service that runs within the service provider network 102. In this embodiment, migration coordinator 114 could include a web server that exposes one or more web service interfaces (e.g., application program interfaces, remote procedure call interfaces, etc.), one or more computer systems configured to implement the migration coordinator 114, and a data store, which can be used to store information used to facilitate a migration of a virtual machine. Illustratively, the migration coordinator 114 may receive requests directed to the service provider network 102, such as a request transmitted by an administrator of the service provider environment 102 or a client computing device 130 to migrate a virtual machine instance 108. The migration coordinator 114 may also determine that a migration should occur without receiving a request to migrate. Examples of such occurrences include, but are not limited to, determinations that external events, such as an indicator that maintenance needs to be performed on the physical computing device, power limits that require migration or determinations that one or more virtual machine instances 108 require more or less resources than are being provided in their current physical computing devices 112. Such a determination can be made based on information obtained from various virtual machine managers 110 or migration managers 140. Although for illustrative purposes, the migration coordinator 114 is shown outside of the physical computing devices 112, the migration coordinator 114 may itself be implemented by one or more physical computing devices 112.

Connected to the service provider network 102 via a network 120 are multiple client computing devices 130. A client computing device 130 can be utilized by a customer of the service provider computer network 102, and can correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In an illustrative embodiment, the client computing device 130 includes necessary hardware and software components for establishing communications with various components of the service provider computer network 102 over the network 120, such as a wide area network (WAN), a local area network (LAN), or a global communications network. For example, the client computing device 130 may be equipped with networking equipment and browser software applications that facilitate communications via the Internet or an intranet. In some embodiments, the client computing device 130 may have access to or control over a virtual machine instance hosted by the service provider computer network 102. In some instances, the client computing devices 130 may interact with the migration managers 140 or the migration coordinator 114, such as to request the migration of one or more virtual machine instances 108. In other embodiments, the migration managers 140 and the migration coordinator 114 may not be exposed to the client computing devices 130.

The networked environment 100 may include different components, a greater or smaller number of components, and can be structured differently. For example, there can be data stores or other computing devices in connection with the migration coordinator 114. As another example, components of the service provider network 102 may communicate with one another via the network 120.

Figure 2A:
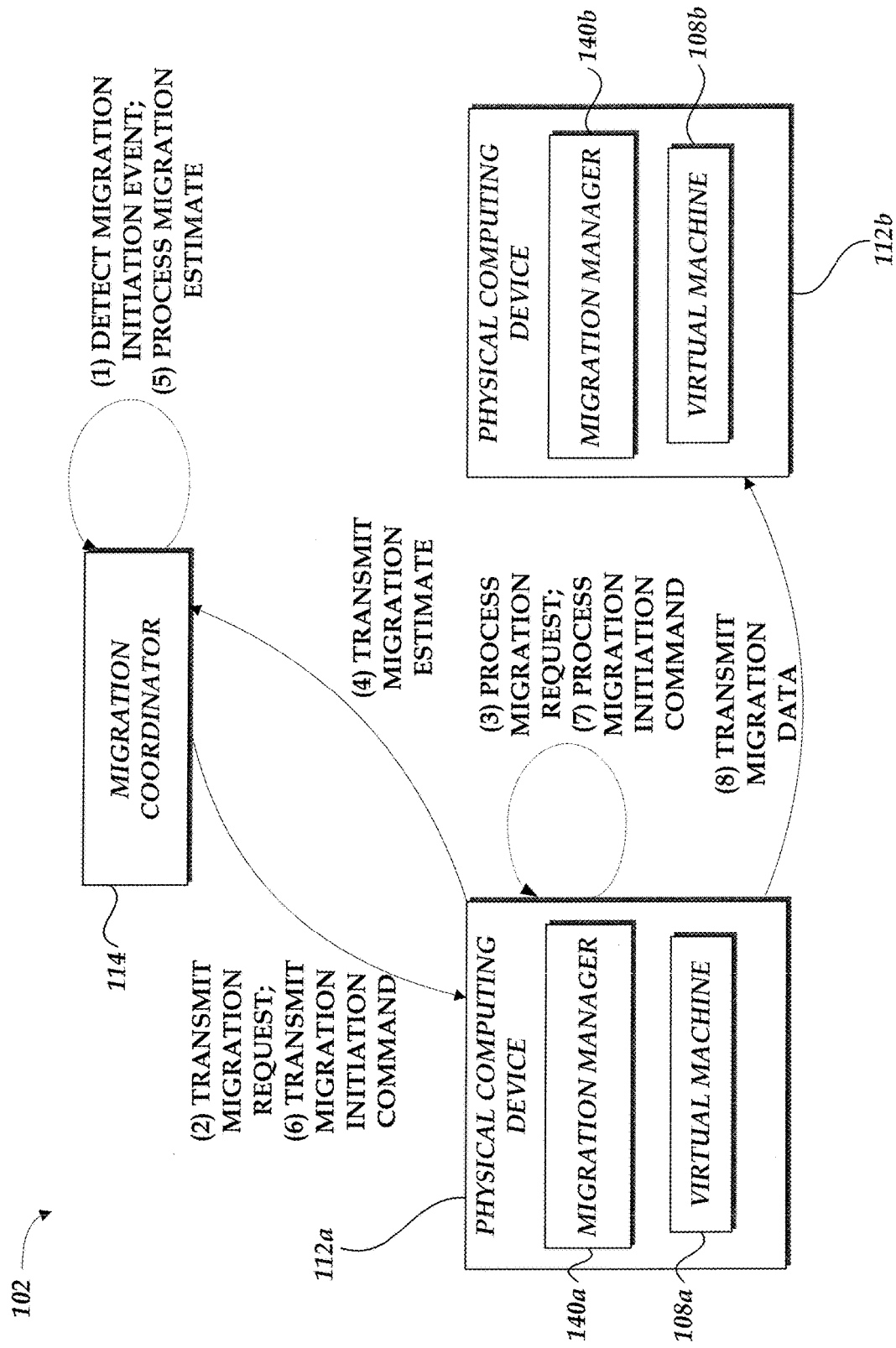
FIGS. 2A-2C are simplified block diagrams of interactions among example components of the service provider network of FIG. 1 illustrating migration of a virtual machine instance.
Figure 2B:
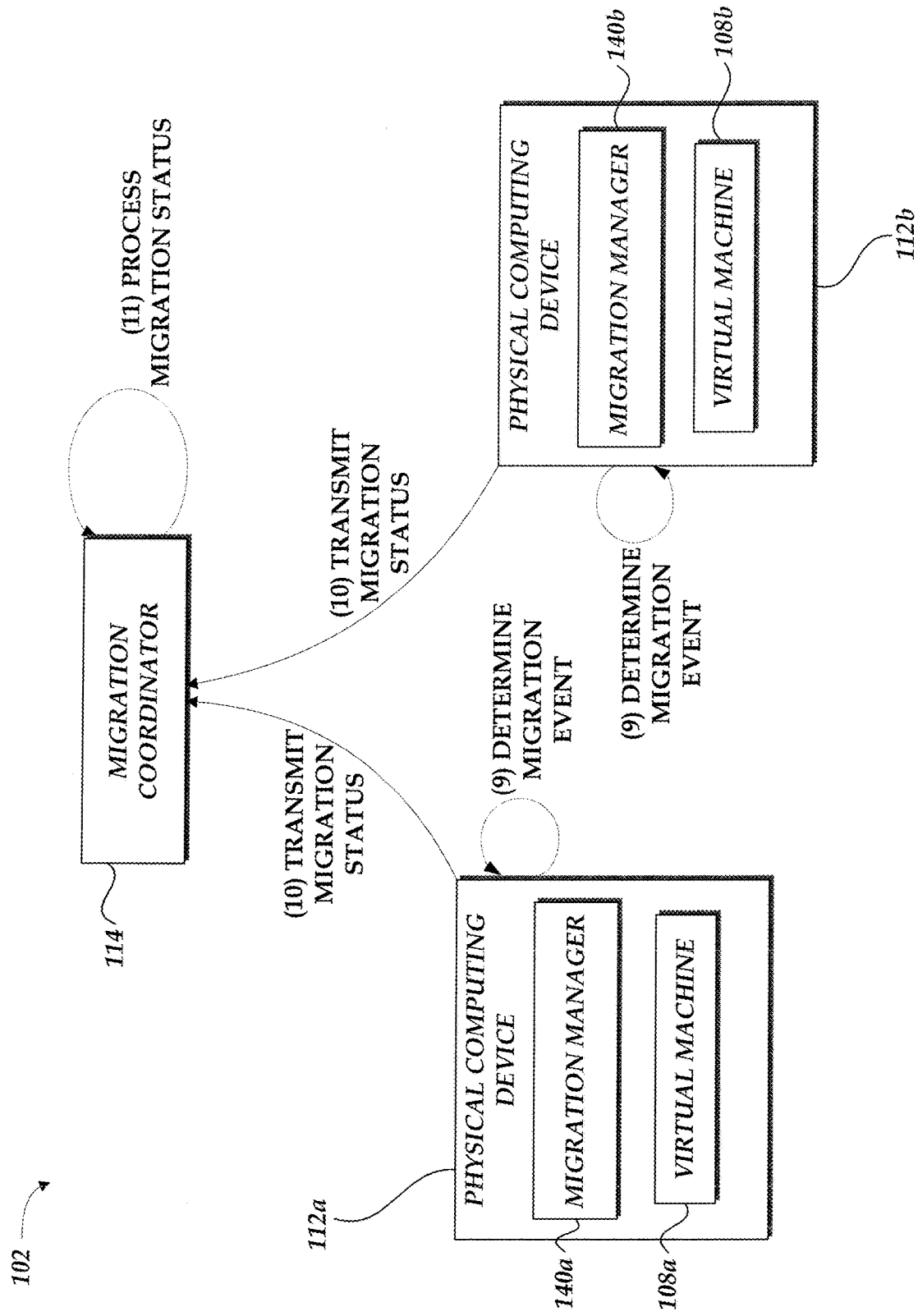
Figure 2C:
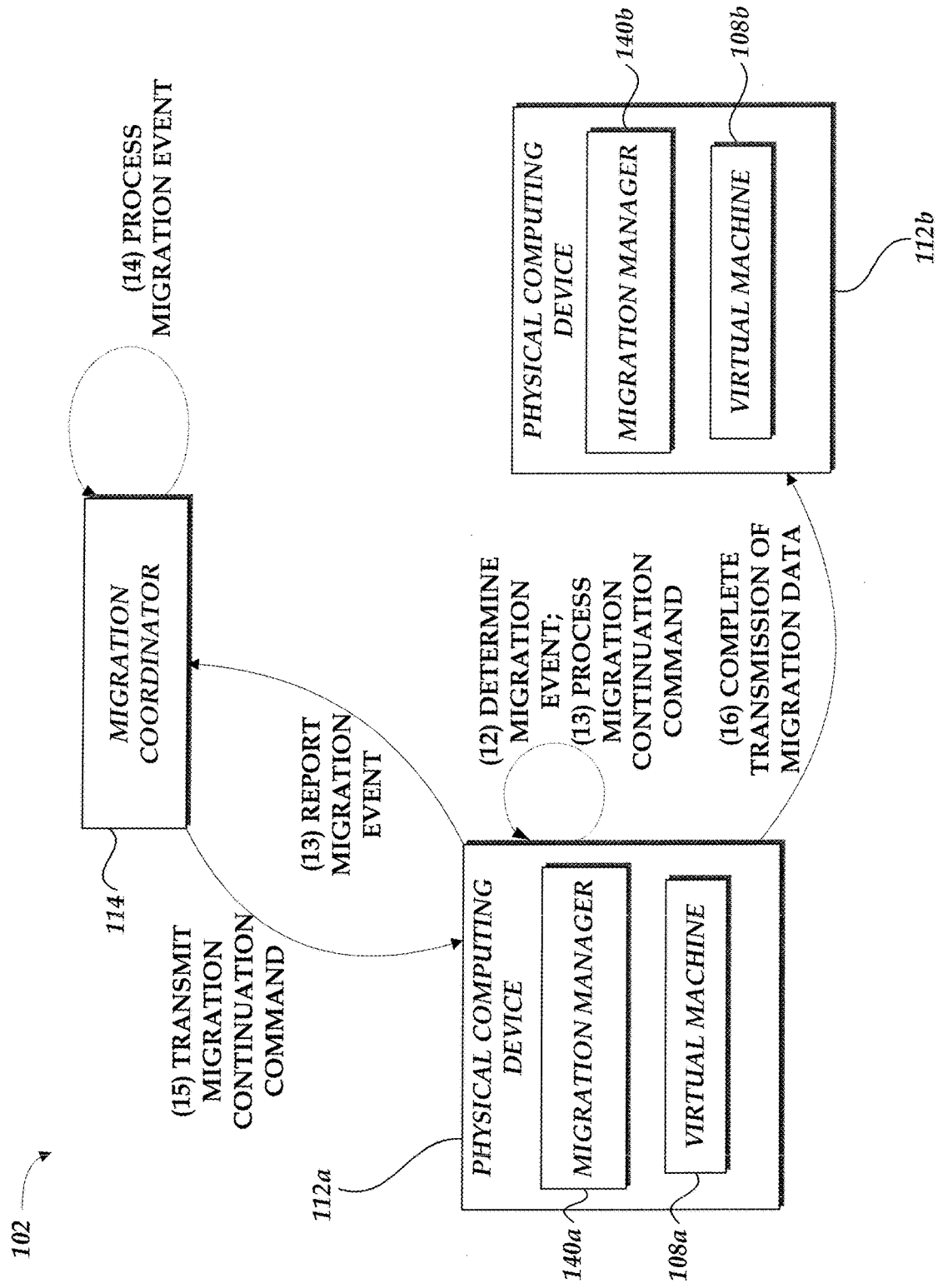

FIGS. 2A-2C are simplified block diagrams of interactions among example components of the service provider network 102 of FIG. 1 illustrating migration of a virtual machine instance 108a. With reference to FIG. 2A, interactions related to the generation and transmission of a migration estimate in response to a migration request are illustrated. As illustrated in FIG. 2A, at (1), the migration coordinator 114 detects a migration initiation event for migrating the virtual machine instance 108a. As described above, the migration initiation event may correspond to a request transmitted by an administrator of the service provider environment or a client computing device 130 to migrate the virtual machine instance 108a. The migration initiation event may also correspond to activities, conditions, factors or requirements (e.g., power limits, network topology changes, requirements or convenience of applicable computing resources, etc., that make migration of the virtual machine instance 108a necessary or desirable) regarding the virtual machine instance 108a, the physical computing device 112a that hosts the virtual machine instance 108a, other physical computing devices or components of the service provider network 102.

At (2), the migration coordinator 114 transmits a migration request to the source computing device 112a that hosts the virtual machine instance 108a. The migration request may specify a target computing device 112b where the virtual machine instance is to be relocated. The migration request may also indicate conditions for the migration, such as a specified period of time during which to initiate the migration. At (3), the physical computing device 112a processes the migration request, for example, via a migration manager 140a. As described above, the migration manager 140a may monitor or otherwise obtain information regarding the resource use of the virtual machine instance 108a or other virtual machine instances hosted by the computing device 112a. This resource use may correspond to memory use, CPU usage, or any other resource usage or combination of resource usages. The migration manager 140a may also monitor or otherwise obtain information, such as bandwidth, throughput, jitter, bit error rate, latency, or other network performance information, regarding communications or interactions between the source computing device 112a and other physical computing devices (e.g. the target computing device 112b), other systems or data services. The migration manager 140a may further determine which of the obtained information is relevant to the migration request. For example, the relevant information may be the size of RAM currently allocated for use by the virtual machine instance 108a, a history of RAM usage by the virtual machine instance 108a, an estimated RAM usage by the virtual machine instance 108a for a future timeframe, current network throughput between the source computing device 112a and the target computing device 112b, an estimated network performance information for a future timeframe, etc. Based on the relevant information, the migration manager 140a may determine one or more estimates regarding the requested migration. For example, the migration manager 140a may determine an estimated time or estimated usage of network resources for completing the migration under the conditions included in the migration request.

At (4), the physical computing device 112a transmits the determined migration estimates to the migration coordinator 114. At (5), the migration coordinator 114 processes the migration estimates. As described earlier, the migration coordinator 114 may facilitate management of the service provider network 102, for example, by configuring, coordinating or monitoring data exchange or resource allocation among various physical or virtual components associated with the service provider network 102. In some embodiments, the migration coordinator 114 may facilitate or manage migration processes of multiple virtual machine instances among multiple physical computing devices. Based on the migration estimates, the external migration manger 114 may determine whether the migration of the virtual machine instance 108a should be initiated. The determination may be based on various factors relevant to the management of the service provider network 102, such as status of dependencies among relevant computing systems or modules, network connections among relevant computing devices, relevant system, or software update status within the service provider network 102, etc. For example, if an estimated time for completing the migration exceeds a specified threshold or an estimated usage of network bandwidth for the migration exceeds a specified limit, the migration coordinator 114 may decide not to initiate the migration so that performance of at least some part or some functionality of the service provider network 102 is not adversely impacted. As another example, if the migration coordinator 114 determines that a total bandwidth required for multiple virtual machine migrations may exceed a threshold based on corresponding migration estimates received from one or more host computing devices, the migration coordinator 114 may prioritize and coordinate the multiple migrations accordingly or may decide not to proceed with some of the migrations. Alternatively or in addition, the migration coordinator 114 may transmit information regarding the migration estimates to a client computing device 130 that requested the migration and obtain input as to whether to initiate the migration from the client computing device.

Upon determining that the migration is to be initiated, at (6), the migration coordinator 114 transmits a migration initiation command to the source computing device 112a. The migration initiation command may specify the target computing device 112b. The migration initiation command may also include criteria for determining migration events and corresponding actions a migration manager should take or simply an indicator to delay completing the migration once the migration manager reaches the point where it determines to stop the virtual machine and migrate the remaining memory pages (e.g., the stop-and-copy phase) until authorization is received from the migration coordinator. For example, the migration initiation command may specify conditions for the migration manager 140a to send status report of the migration to the migration coordinator 114, to suspend the migration, to delay entering a subsequent phase of the migration, to request further command from the migration coordinator 114 regarding the migration, or to cancel or terminate the migration. In some embodiments, the migration coordinator 114 or the source computing device 112a forwards at least some of the criteria related to a migration manager 140b of the target computing device 112b. Therefore, similarly to the migration manager 140a, the migration manager 140b may take corresponding actions when it detects applicable conditions during the migration process.

At (7), the source computing device 112a processes the migration initiation command, for example, via the migration manager 140a. As described earlier, the migration manager 140a itself may have default criteria related to the migration, which may supplement or be overridden by the criteria, if any, specified in the migration initiation command. For example, a default criterion requires the migration manager to report the status of migration to the migration coordinator periodically in accordance with a predefined time interval. The migration manager 140a may consolidate default and received criteria related to the migration for purposes of determining migration events that match one or more criteria.

At (8), the source computing device 112a starts transmission of migration-related data associated with the virtual machine instance 108a to the target computing device 112b (e.g., the migration manager 140a enters the memory-copy phase of the migration). Illustratively, the source computing device 112a may start copying memory pages associated with the virtual machine instance 108a to the target computing device 112b. The migration manager 140a may incorporate necessary functionality to facilitate migrating the virtual machine instance 108a. For example, the migration manager 140a may adjust the resources used for the migration according to a state of the migration and the available computing or network resources.

As described above, the migration manager 140a may monitor or otherwise obtain information regarding the data transmission, the virtual machine instance 108a that is being migrated, and relevant usage of computing resources. If the obtained information meets one or more criteria included in the consolidated criteria regarding the migration, the migration manager 140a determines the situation to be a migration event and performs corresponding actions such as reporting migration status, delaying the migration, requesting further command, etc.

Turning now to FIG. 2B, interactions related to determination of a migration event and transmission of migration status are illustrated. With reference to FIG. 2B, at (9), the migration manager 140a or 140b may determine a migration event (e.g., certain time has passed since the initiation of migration data transmission) that requires the migration manager to report status of the migration to the migration coordinator 114. At (10), the migration manager 140a or 140b may cause the physical computing device 112a or 112b to transmit migration status information to the migration coordinator 114. The transmitted information may include a size or percentage of memory pages that have been transmitted, revised estimates as compared to the initially determined migration estimates, relevant usage of computing or network resources, anomalies, or exceptions occurred during the migration, etc. At (11), the migration coordinator 114 receives and processes the transmitted migration status information. The migration coordinator 114 may use the status information to facilitate management of the service provider network 102, for example, by adjusting or prioritizing computing resource allocations for migration of multiple virtual machine instances. The migration coordinator 114 may also use the status information to strategically configure or prepare resources (e.g., by determining a proper timing) to be associated with a virtual machine instance 108b, which is to be hosted by the target computing device 112b. A person of skill in the art will understand that the virtual machine instance 108b may be currently non-instantiated or dormant, and will correspond to the virtual machine instance 108a after completion of migration.

Turning now to FIG. 2C, interactions related to reporting a migration event and obtaining a command in response to the reported migration event are illustrated. With reference now to FIG. 2C, at (12), the migration manager 140a determines a migration event (e.g., 90% of memory pages have been copied and synchronized to the target computing device 112b and the migration manager is ready to enter the "stop-and-copy" phase to copy the remaining memory pages) where the migration manager 140a is required to delay entering a subsequent phase of the migration (e.g., keeping copied memory pages synchronized between the source and target computing devices and either holding off on copying additional memory pages or continuing to copy the active memory pages) and to request a further command from the migration coordinator 140. At (13), the migration manager 140a may report the migration event to the migration coordinator 114 by causing the computing device 112a to transmit migration event information to the migration coordinator 114. The transmitted migration event information may include a description of the determined migration event, one or more updated estimates of the migration, or one or more recommendations of future resource allocation or management to the migration coordinator 114 (e.g., to limit certain other application's usage of network connection between the source and target computing devices at a future time in order to prioritize the migration) that the migration coordinator 114 may adopt to facilitate the migration.

At (14), the migration coordinator 114 processes the reported migration event and determines whether or how to proceed further with the migration. In some embodiments, the migration coordinator 114 may transmit information regarding the reported migration event to a client computing device 130 that requested the migration and obtain input as to whether to continue the migration from the client computing device 130. In some embodiments, the migration coordinator 114 may use the reported migration event information or the client input to facilitate management of the service provider network 102, for example, by adjusting computing or networking resource allocations to facilitate the migration or to prioritize or coordinate multiple migration processes. The migration coordinator 114 may also use the reported migration event information to strategically configure or prepare resources, or adjust previously configured resources, to be associated with the corresponding virtual machine instance 108b (currently non-instantiated or dormant).

For example, in an embodiment the migration coordinator can be configured to transition to a "stop-and-copy" phase based on whether resources for the virtual machine are in place on the target or whether the service provider environment has been configured for the virtual machine to be hosted by the target. The resources could be provided or managed by other services that operate within the service provider environment. For example, these services could include a health monitoring service (a service that monitors the health of the network used to connect the source to the target), a block storage service (that attaches volumes to virtual machines), a mapping table service (that maps virtual IP addresses to physical IP addresses), a service that manages IP addresses allocated to virtual machines, etc. Once these services have been informed that a migration will occur (or has started), the services can begin to set up resources such as IP address mappings and volumes on the target. The services can be configured to write data to a data store accessible to the migration coordinator indicating whether the resources have been successfully set up or where the services are in the set-up process. When the migration coordinator receives a signal from a migration manager indicating that the migration manager is ready to enter the next phase of a migration, the migration coordinator can check the data store to determine if the necessary resources have been set up on the target or will have been set up by the time the migration is complete. In this example, if this check passes the migration coordinator can determine that the migration is to continue. In some embodiments, an administrator can configure the migration coordinator to treat some resources as optional and some as required.

In an example embodiment, the migration coordinator can factor in a migration time value when determining whether the migration should transfer to the next phase. The migration time value can be set by an administrator or adjusted during runtime and can represent a maximum amount of time a migration can take. If the estimated amount of time it will take to complete the migration is greater than the migration time value, then the migration coordinator can cancel the migration or delay entering into the next phase for a period of time and then check again to see if the estimate is now lower than the migration time value.

In one example, an administrator can take into account the amount of time an average migration occurs or how fast a migration needs to occur to avoid a negative customer experience when setting a migration time value. Similarly, the migration time value can be set on a per-customer basis to provide for different classes of service, or be changed based on conditions in the data center. In addition, the migration coordinator can be configured to change the migration time value based on how long a migration has been in the "memory-copy" phase. In this example, the migration time value can be initially set to a low value, which can periodically increase until the migration time value is greater than the estimate or a timer expires and the migration coordinator cancels the migration. In an embodiment, the migration coordinator can be configured to first determine whether all the required resources are available and then determine whether the estimated amount of time it will take to complete the migration is greater than the migration time value.

Upon determining that the migration is to be continued, at (15), the migration coordinator 114 transmits a migration continuation command in response to the reported migration event, to the computing device 112a. The migration continuation command may instruct the migration manger 140a to complete the migration or the conditions around when the migration manager can complete the migration. For example, the migration coordinator could instruct the migration manager to complete the migration when the estimated time to complete is lower than a migration time value or how long it should try to complete the migration before canceling. The migration manager 140a, at (16), may process the migration continuation command, cause the virtual machine instance 108a to be stopped or shut down at the source computing device 112a, and copy the remaining memory pages and virtual machine state to the target device 112b. In the meantime, the migration coordinator 114 may complete preparation of other computing resources to be associated with the corresponding virtual machine instance 108b, such as data storage and network connectivity. Once all the related resources are ready to be associated with the corresponding virtual machine instance 108b at the target computing device 112b, the migration coordinator 114 may cause the corresponding virtual machine 108b to be activated on the target computing device 112b, for example, by sending a command to a hypervisor executing at the target computing device 112b to instantiate the corresponding virtual machine 108b with all the associated computing resources.

Figure 3:
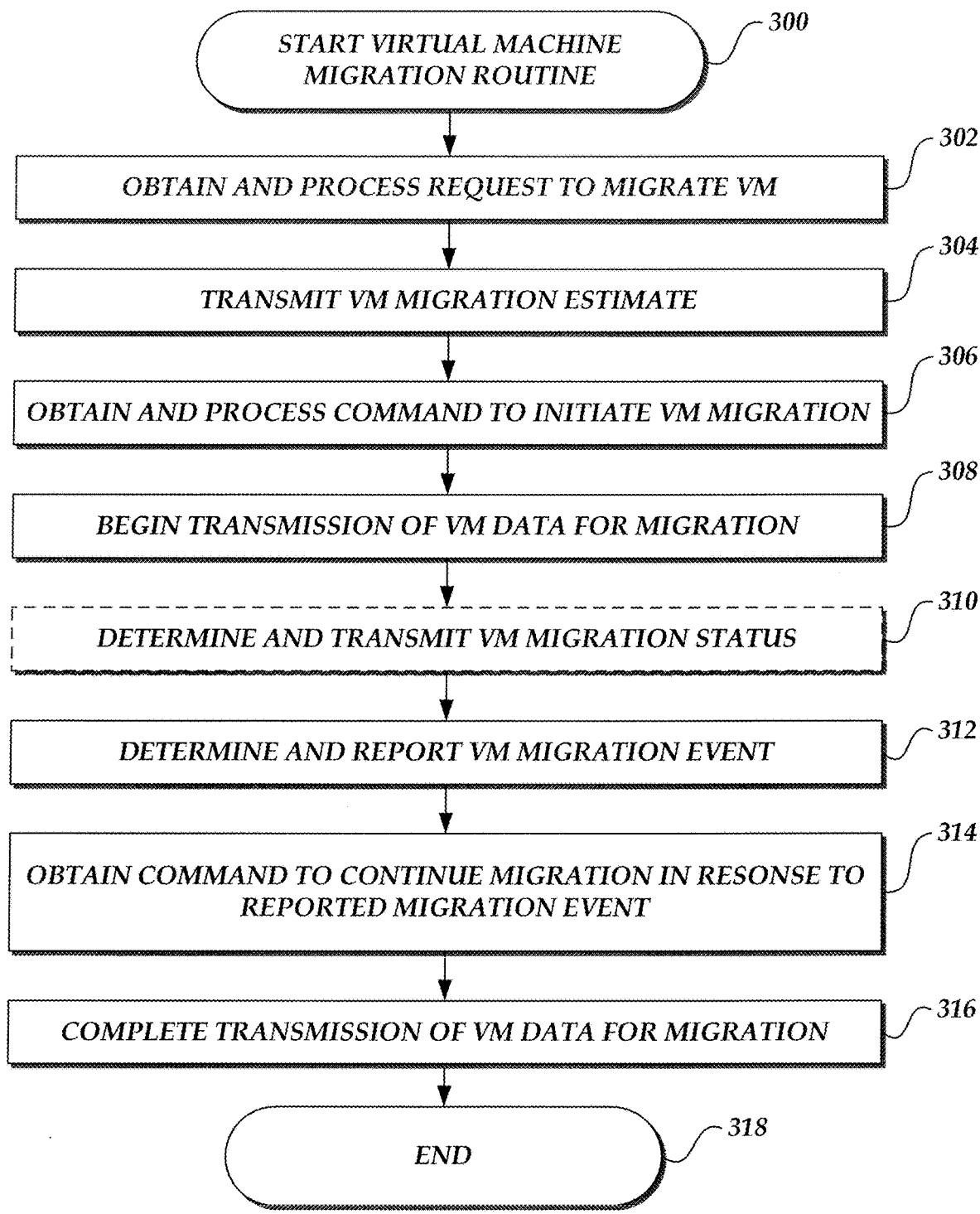
FIG. 3 is a flowchart illustrating a virtual machine instance migration routine implemented by a migration manager.

FIG. 3 is a flowchart illustrating a virtual machine instance migration routine implemented by a migration manager 140. The routine starts at block 300. At block 302, the migration manager 140 associated with a source computing device obtains and processes a request to migrate a virtual machine instance 108 hosted by the source computing device. The migration request may specify a target computing device where the virtual machine instance is to be relocated. The migration request may also indicate conditions for the migration, such as a specified period of time during which to initiate the migration. As described above, the migration manager 140 may monitor or otherwise obtain information regarding the resource use of the virtual machine instance 108 requested to be migrated or other virtual machine instances hosted by the source computing device. The migration manager 140 may also monitor or otherwise obtain information regarding communications or interactions between the source computing device and other physical computing devices (e.g. the target computing device), other systems or data services. The migration manager 140 may further determine which of the obtained information is relevant to the migration request, such as information corresponding to a pattern of memory usage by the virtual machine instance 108. Based on the relevant information, the migration manager 140 may determine one or more estimates, such as how long it might take to complete the memory-transfer portion (i.e., brownout) of the requested migration under the conditions specified in the request. At block 304, the migration manager 140 transmits the determined estimates to a migration coordinator 114 or a client computing device 130 in order to obtain further commands regarding the migration.

At block 306, the migration manager 140 obtains and processes a command to initiate the migration of the virtual machine instance 108. The migration initiation command may specify the target computing device. The migration initiation command may also include criteria related to the migration. For example, the migration initiation command may specify criteria for triggering the migration manager 140 to send status report of the migration, to delay entering a subsequent phase of the migration, to request further commands regarding the migration, or to cancel or terminate the migration. As described earlier, the migration manager 140 itself may have default criteria related to the migration, which may supplement or be overridden by the criteria, if any, specified in the migration initiation command. The migration manager 140 may consolidate default and received criteria related to the migration for purposes of determining migration events that match one or more criteria.

At block 308, the migration manager 140 causes transmission of migration-related data associated with the virtual machine instance 108 from the source computing device to the target computing device. For example, the migration manager 140 may cause the source computing device to start copying memory pages associated with the virtual machine instance 108 to the target computing device. As described above, the migration manager 140 continues to monitor or otherwise obtain information regarding the data transmission, the virtual machine instance 108 that is being migrated, and relevant usage of computing resources. If the obtained information meets one or more criteria included in the consolidated criteria regarding the migration, the migration manager 140 determines the situation to be a migration event and performs corresponding actions such as reporting migration status, pausing the migration, requesting further commands, etc.

Optionally at block 310, the migration manager 140 may determine occurrence of a migration event (e.g., a certain number of percentage of memory pages has been copied) that requires the migration manager 140 to report status of the migration to the migration coordinator 114 or the client computing device 130, and the migration manager 140 may collect status information regarding the migration and cause the source computing device to transmit the migration status information to the migration coordinator 114 or the client computing device 130. The transmitted information may include a number or percentage of memory pages that have been transmitted, revised estimates as compared to the initially determined migration estimates, relevant usage of computing or networking resources, etc. It should be noted that block 310 may occur multiple times during the migration manager 140's execution of the routine of FIG. 3, depending on the determination of applicable migration events.

At block 312, the migration manager 140 determines a migration event (e.g., the migration manager is ready to enter a next phase of the migration, and wants to stop or shut down the virtual machine instance 108 at the source device 112a before frequently accessed memory pages can be copied) where the migration manager 140 is required to delay entering the next phase and request a further command from the migration coordinator 114 or the client computing device 130. The migration manager 140 reports the migration event by causing the source computing device to transmit migration event information to the migration coordinator 114 or the client computing device 130. The transmitted migration event information may include a description of the determined migration event, one or more updated estimates of the migration, or one or more recommendations of future resource allocation or management to the migration coordinator 114 (e.g., to complete attachment or deployment of corresponding resources to the target computing device by a specified future time after issuance of command to enter a subsequent migration phase). It should be noted that block 312 may occur multiple times during the migration manager 140's execution of the routine of FIG. 3, depending on the determination of applicable migration events.

At block 314, the migration manager 140 obtains a migration continuation command in response to the reported migration event, from the migration coordinator 114 or the client computing device 130. In some embodiments, the migration continuation command may instruct the migration manager 140 to continue the migration. In accordance with these embodiments, the continuation command may specify revised criteria regarding the migration for determining future migration events as well as corresponding actions to be taken by the migration manager 140. In other embodiments, the migration continuation command may instruct the migration manger 140 to proceed with a subsequent phase of the migration or to complete the migration.

At block 316, the migration manager 140 may process the migration continuation command. For example, upon receiving a migration continuation command instructing the migration manager 140 to proceed with a subsequent phase of the migration at a time specified in the continuation command, the migration manager 140 may cause the virtual machine instance 108 to be stopped or shut down at the source computing device, and copy the remaining memory pages associated with the virtual machine to the target device at the specified time. In the meantime, the migration coordinator 114 or a virtual machine manager 110 of the target computing device may complete preparation of other computing resources to be associated with a corresponding virtual machine, which is to be instantiated on the target computing device, so that functionality of the migrated virtual machine instance is resumed. The routine of FIG. 3 ends at block 318.

Figure 4:
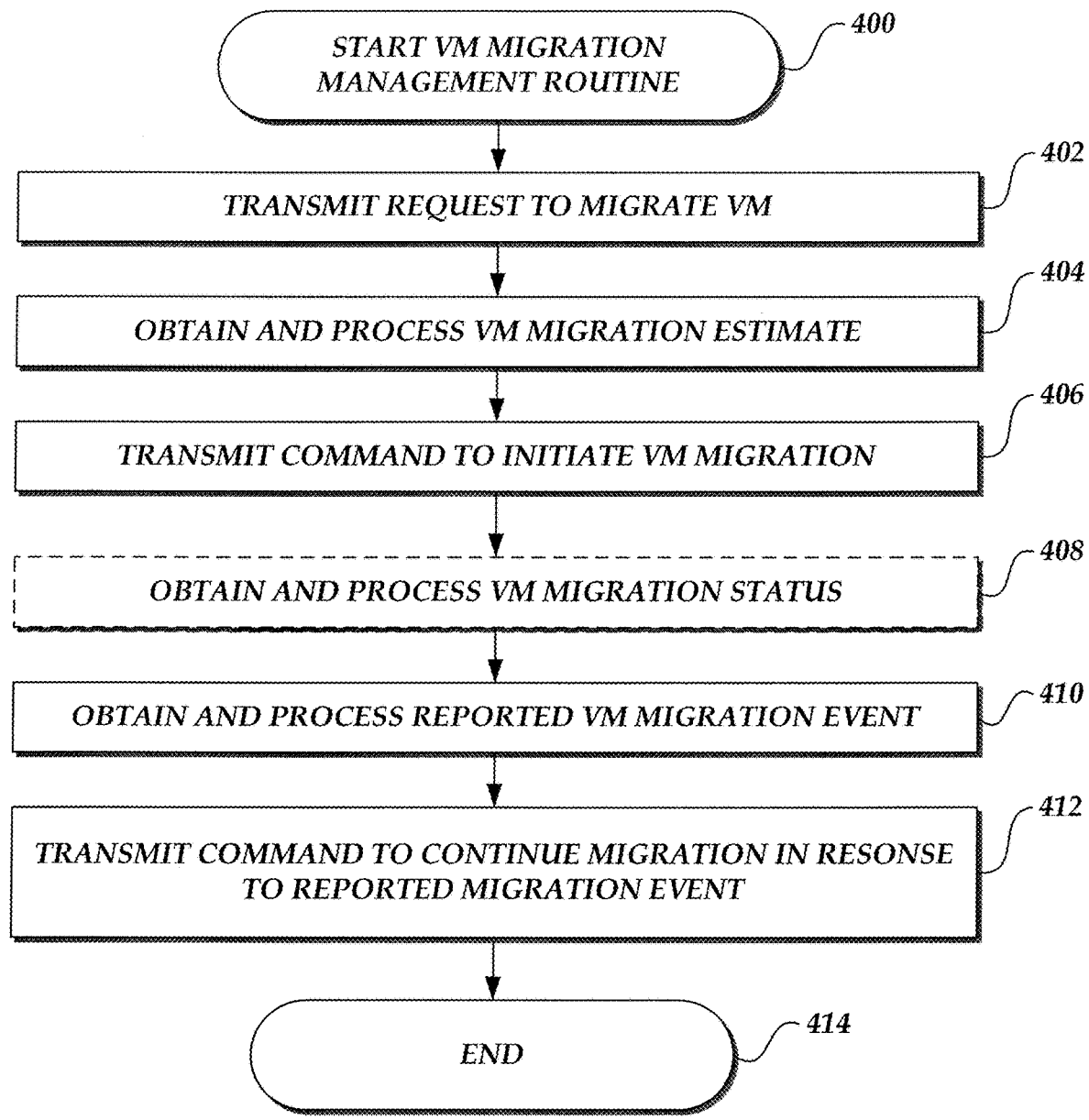
FIG. 4 is a flowchart illustrating a virtual machine migration management routine implemented by a migration coordinator.

FIG. 4 is a flowchart illustrating a virtual machine migration management routine implemented by the migration coordinator 114. The routine starts at block 400. At block 402, the migration coordinator 114 transmits a migration request to source computing device 112a that hosts the virtual machine instance 108a. The migration request may specify a target computing device 112b where the virtual machine instance is to be relocated. The migration request may also indicate conditions for the migration, such as a specified period of time during which to initiate the migration.

At block 404, the migration coordinator 114 obtains and processes estimates regarding to the requested migration of virtual machine instance 108a. As described above, the migration coordinator 114 may facilitate management of the service provider network 102, for example, by configuring, coordinating or monitoring data exchange or resource allocation among various physical or virtual components associated with the service provider network 102. In some embodiments, the migration coordinator 114 may facilitate, or manage, the migration processes of multiple virtual machine instances among multiple physical computing devices. Based on the migration estimates, the external migration manger 114 may determine whether the migration of the virtual machine instance 108a should be initiated.

Illustratively, the determination may be based on various factors relevant to the management of the service provider network 102, such as status of dependencies among relevant computing systems or modules, network connections among relevant computing devices, relevant system or software update status within the service provider network 102, etc. For example, if there is no ongoing update to an operating system running on the physical computing device 112a and the network bandwidth between the source and target computing devices 112a and 112b is above a threshold value, the migration coordinator 114 may decide to initiate the migration. As will be appreciated by a person of skill in the art, the factors contributing to the determination of migration initiation may also include resources affected by other operations beside virtual machine migration.

Upon determining that the migration is to be initiated, at block 406, the migration coordinator 114 transmits a migration initiation command to the source computing device 112*a*, and in some embodiments, to the target computing device 112*b*. The migration initiation command may include criteria for determining migration events and corresponding actions a migration manager should take. For example, the migration initiation command may specify conditions for a migration manager to send status report of the migration to the migration coordinator 114, to suspend the migration, to delay entering a subsequent phase of the migration, to request further command from the migration coordinator 114 regarding the migration, or to cancel or terminate the migration.

Optionally at block 408, the migration coordinator 114 obtains and processes migration status information to the migration coordinator 114. The transmitted information may include a size or percentage of memory pages that have been transmitted, revised estimates as compared to the initially determined migration estimates, relevant usage of computing or network resources, anomalies, or exceptions occurred during the migration, etc. The migration coordinator 114 may use the status information to facilitate management of the service provider network 102, for example, by adjusting or prioritizing computing resource allocations for migration of multiple virtual machine instances. The migration coordinator 114 may also use the status information to strategically configure or prepare resources (e.g., by determining a proper timing) to be associated with a virtual machine instance 108*b*, which is to be hosted by the target computing device 112*b*.

At block 410, the migration coordinator 114 obtains and processes a migration event reported by a migration manager. The reported migration event information may include a description of a corresponding migration event, one or more updated estimates of the migration, or one or more recommendations of resource allocation or management to the migration coordinator 114 (e.g., to limit other application's usage of network connection between the source and target computing devices) that the migration coordinator 114 may adopt to facilitate the migration. The migration coordinator 114 processes the reported migration event and determines whether or how to proceed further with the migration of the virtual machine instances, individually or collectively. For example, the migration coordinator 114 may allocate computing resources or limit activities of other applications or virtual machines to increase the network bandwidth between the source and target computing devices 112*a* and 112*b* and thereby facilitate a subsequent phase of the migration. Illustratively, the migration coordinator 114 may determine a time in the future when less than a threshold number of applications or virtual machines are scheduled to utilize network resources related to communications between the source and target. By anticipating future bandwidth use, the network bandwidth between the source and the target is maximized. Allowing entrance into a subsequent phase, such as a stop-and-copy phase, of the migration at the determined time may minimize a downtime of the virtual machine associated with the stop-and-copy phase. As another example, the migration coordinator may delay entrance into a next phase of the migration until certain resources (e.g., security settings, network interfaces, storage volumes, etc.) are ready to be associated with a corresponding virtual machine instance at the target computing device. Illustratively, the migration coordinator may coordinate multiple migration processes of virtual machine instances of different types and priorities, which may require different resources and timing of their availability. Other factors such as resource allocation related to launching of new virtual machine instances, system maintenance, or software updates associated with the service provider network 102 may also affect the timing for entering a subsequent phase of the migration. Based on these factors, the migration coordinator may utilize a master plan or policy to dynamically schedule the availability of the resources to be associated with a corresponding virtual machine instance at the target computing device and delay entrance into the next phase of the migration until the resources become available.

Upon determining that the migration is to be continued, at block 412, the migration coordinator 114 transmits a migration continuation command in response to the reported migration event, to the computing device 112*a* or 112*b*. The migration continuation command may include instructions that are time-based or prioritized so that some instructions are processed before others. The migration continuation command may instruct the migration manger 140*a* or 140*b* to proceed with a subsequent phase or to complete the migration upon receipt of the continuation command or in accordance with a time or criterion specified in the continuation command. For example, the continuation command may instruct the migration manager to enter the subsequent phase at a time that corresponds to a maximized bandwidth between the source and target computing devices. In the meantime, the migration coordinator 114 may complete preparation of other computing resources to be associated with the corresponding virtual machine instance 108*b*, such as data storage and network connectivity. Once all the related resources are ready to be associated with the corresponding virtual machine instance 108*b* at the target computing device 112*b*, the migration coordinator 114 may cause the corresponding virtual machine 108*b* to be activated on the target computing device 112*b*, for example, by sending a command to a hypervisor executing at the target computing device 112*b* to instantiate the corresponding virtual machine 108*b* with all the associated computing resources. The routine of FIG. 4 ends at block 414.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes that come within the meaning and range of equivalency of the claims are to be embraced within their scope.

What is claimed is:

1. A computer-implemented method for managing virtual machine migration, the computer-implemented method comprising:
    under control of a hardware computing device configured with specific computer executable instructions,
    obtaining, by a migration manager, a first command to initiate migration of a virtual machine instance hosted on a first physical computing device to a second physical computing device, the first command identifying a criterion for detecting a migration event and an action to perform in response to detecting the migration event, wherein the migration manager is separate from the virtual machine instance;
    initiating, by the migration manager, a first phase of migration, wherein the first phase of migration includes copying contents of at least a first portion of memory assigned to the virtual machine instance to the second physical computing device;
    detecting the migration event based at least in part on a determination that the criterion identified in the first command has been satisfied;
    in response to detecting the migration event, transmitting an indication that the migration event has been detected; and
    obtaining, by the migration manager, a second command to perform the action identified in the first command, wherein performing the action comprises initiating a second phase of migration, and wherein the second phase of migration includes copying contents of a second portion of the memory assigned to the virtual machine instance to the second physical computing device.

2. The computer-implemented method of claim 1, wherein the memory assigned to the virtual machine instance comprises a plurality of memory pages, and wherein the second portion of the memory comprises one or more active memory pages of the plurality of memory pages.

3. The computer-implemented method of claim 1 further comprising determining the second portion of the memory assigned to the virtual machine instance that is copied in the second phase of migration.

4. The computer-implemented method of claim 1, wherein copying the contents of at least the first portion of the memory assigned to the virtual machine instance to the second physical computing device comprises:
    copying a plurality of memory pages to the second physical computing device;
    copying a first subset of the plurality of memory pages to the second physical computing device, wherein the first subset comprises memory pages that were modified after the plurality of memory pages were copied to the second physical computing device; and copying a second subset of the plurality of memory pages to the second physical computing device, wherein the second subset comprises memory pages that were modified after the first subset of the plurality of memory pages was copied to the second physical computing device.

5. The computer-implemented method of claim 4, wherein the first subset comprises a first memory page and wherein the second subset comprises the first memory page.

6. The computer-implemented method of claim 4, wherein the criterion for detecting the migration event includes at least one of:

the second subset corresponding to the first subset;
a threshold size of the second subset;
the second subset corresponding to a threshold percentage of the plurality of memory pages; or
a threshold time interval associated with copying the second subset.

7. A system comprising:

a memory configured to store computer-executable instructions; and a processor in communication with the memory, wherein the computer-executable instructions, when executed by the processor, configure the processor to:

transmit, to a migration manager, a first command to initiate a first phase of migrating a virtual machine from a source computer system to a target computer system, wherein the first command specifies at least a criterion that defines a migration event and an action to perform in response to detecting the migration event;

obtain an indication that the migration event has been detected based at least in part on an evaluation of the criterion; and in response to the indication, transmit, to the migration manager, a second command to initiate a second phase of migrating the virtual machine from the source computer system to the target computer system.

8. The system of claim 7, wherein the action to perform in response to detecting the migration event comprises transmitting the indication that the migration event has been detected.

9. The system of claim 7, wherein the first command specifies a criterion associated with the migration event.

10. The system of claim 9, wherein the indication that the migration event has been detected comprises a determination that the criterion has been satisfied.

11. The system of claim 10, wherein the determination that the criterion has been satisfied comprises a determination that a time estimate associated with the second phase satisfies a threshold.

12. The system of claim 7, wherein the processor is further configured to:

obtain, from a data store, information regarding one or more resources that are required to instantiate the virtual machine on the target computer system; and
determine that the one or more resources have been made available.

13. The system of claim 7, wherein the first phase of migrating the virtual machine from the source computer system to the target computer system comprises copying a plurality of memory pages from the source computer system to the target computer system.

14. The system of claim 7, wherein the second phase of migrating the virtual machine from the source computer system to the target computer system comprises:

causing the source computer system to stop execution of the virtual machine;
identifying an active memory page, wherein the active memory page was copied from the source computer system to the target computer system during the first phase of migrating the virtual machine, and wherein the active memory page was modified after it was copied;
copying the active memory page from the source computer system to the target computer system; and
causing the target computer system to begin execution of the virtual machine.

15. A non-transitory computer-readable storage medium storing computer-executable instructions that, when executed by a processor, perform operations comprising:

obtaining a first command to migrate a virtual machine instance from a source computing device to a target computing device, the first command specifying at least a criterion for detecting a migration event and an action to perform in response to detecting the migration event;
initiating a first phase of migration in response to the command;
detecting the migration event based at least in part on an evaluation of the criterion;
in response to detecting the migration event, sending an indication that the migration event has been detected; and
obtaining a second command to initiate a second phase of migration in accordance with the action.

16. The non-transitory computer-readable storage medium of claim 15, wherein detecting the migration event comprises determining that the criterion has been satisfied.

17. The non-transitory computer-readable storage medium of claim 15, wherein the action comprises one or more of:

delaying the second phase of migration until a second criterion is satisfied; or
reserving one or more resources of the target computing device.

18. The non-transitory computer-readable storage medium of claim 17, wherein the second criterion comprises availability of one or more resources of the target computing device.

19. The non-transitory computer-readable storage medium of claim 15, wherein detecting the migration event comprises detecting an anomaly regarding the network connection between the source computing device and the target computing device, and wherein the action comprises delaying the second phase of migration until the anomaly no longer occurs.

20. The non-transitory computer-readable storage medium of claim 15, wherein the operations further comprise:

determining that the second phase of migration has completed; and
causing the target computing device to instantiate the virtual machine instance.

* * * * *